(12) United States Patent
Farias

(10) Patent No.: US 7,822,681 B2
(45) Date of Patent: Oct. 26, 2010

(54) FINANCIAL COLLABORATION NETWORKS

(76) Inventor: David G. Farias, 1012 S. Copper Key Ct., Gilbert, AZ (US) 85233

( * ) Notice: Subject to any disclaimer, the term of this patent is extended or adjusted under 35 U.S.C. 154(b) by 760 days.

(21) Appl. No.: 11/374,727

(22) Filed: Mar. 13, 2006

(65) Prior Publication Data

US 2006/0206416 A1    Sep. 14, 2006

Related U.S. Application Data

(60) Provisional application No. 60/661,148, filed on Mar. 11, 2005.

(51) Int. Cl.
*G06Q 40/00*    (2006.01)
(52) U.S. Cl. ...................................................... 705/38
(58) Field of Classification Search .................... 705/38
See application file for complete search history.

(56) References Cited

U.S. PATENT DOCUMENTS

| | | | | |
|---|---|---|---|---|
| 5,870,721 | A * | 2/1999 | Norris | 705/38 |
| 6,920,434 | B1 * | 7/2005 | Cossette | 705/38 |
| 2002/0111901 | A1 * | 8/2002 | Whitney | 705/38 |
| 2002/0124188 | A1 * | 9/2002 | Sherman et al. | 713/201 |
| 2002/0194120 | A1 * | 12/2002 | Russell et al. | 705/38 |
| 2003/0233319 | A1 | 12/2003 | Lawrence | |
| 2004/0111639 | A1 | 6/2004 | Schwartz et al. | |
| 2005/0021353 | A1 * | 1/2005 | Aviles et al. | 705/1 |
| 2005/0027626 | A1 * | 2/2005 | Garcia | 705/35 |
| 2006/0224502 | A1 * | 10/2006 | McGowan | 705/38 |
| 2007/0027791 | A1 * | 2/2007 | Young et al. | 705/37 |
| 2007/0061248 | A1 * | 3/2007 | Shavit et al. | 705/37 |
| 2007/0083462 | A1 * | 4/2007 | Cubillo et al. | 705/38 |

OTHER PUBLICATIONS

"Borrow from an online stranger", Evening Standard, London (UK): Mar. 7, 2005, p. 6.*
"What is Zopa", Zopa website, Mar. 7, 2005.*
Shannon, Back, "Agency teaches Small Businesses", Tampa Tribune. Tampa, Fla.: Aug. 11, 2001 p. 1.*
Shannon, Behnken, "CDC Leader Plans to Expand Programs", Tampa Tribune, Fla.: Feb. 21, 2002. p. 4.*
K. Oanh Ha, "Savings Clubs substitute for Banks in East San Jose, Califl, Latino Community", San Jose Mercury News, Nov. 12, 2002 pp. 1-3.*
Judy Margolis, "When a little money goes a long way", Canadian Banker. Toronto: Jan./Feb. 1996. vol. 103, Iss. 1 p. 26, 4 pgs.*
International Search Report and Written Opinion dated Sep. 5, 2007, for application No. PCT/US06/08860 filed on Mar. 13, 2006.

* cited by examiner

*Primary Examiner*—Ella Colbert
*Assistant Examiner*—Mohammad Z Shaikh
(74) *Attorney, Agent, or Firm*—Holme Roberts & Owen LLP

(57) ABSTRACT

The disclosed system and method for providing financial collaboration networks generally includes a data processing system adapted to permit a plurality of group collaborators to perform financial transactions with a plurality of users or network participants. Representative embodiments of the present invention generally provide web-based financial collaboration systems that may be adapted to permit a plurality of borrowers, for example, to negotiate more favorable terms with a lender for subsequent loans made to the borrower members of the collaborative group.

13 Claims, 7 Drawing Sheets

PRIOR ART

FINANCIAL COLLABORATION NETWORKS

RELATED APPLICATIONS

This application claims priority to U.S. Provisional Patent Application Ser. No. 60/661,148 filed in the United States Patent and Trademark Office on Mar. 11, 2005 by David G. Farias.

FIELD OF INVENTION

The present invention generally concerns financial and business practices; and more particularly, representative and exemplary embodiments of the present invention generally relate to financial collaboration and lending networks.

BACKGROUND OF INVENTION

Debt generally allows people and organizations to do things that they otherwise wouldn't be able or allowed to. Typically, people in industrialized nations use debt to purchase houses, cars and many other things too expensive to buy with cash on hand. Businesses also use debt in many ways to leverage the investment made in their private equity.

The leveraging of the borrower's finances (i.e., the proportion of debt to equity) is considered important in determining the level of risk associated with an investment; the more debt per equity, the riskier the transaction in terms of probability of repayment. Debt is generally regarded as a sign of optimism and that a society believes in its future (especially earnings).

In general, financial lending services are an established and integral part of our economy. The lending industry has many different segments with several product offerings that are serviced by numerous types of entities, which may comprise intermediaries (e.g., 'middle men'). Examples of representative segments include consumer lending and business lending, as well as others. Lending markets further consist of sub-segments including prime and sub-prime lending. Product offerings within the consumer segment, for example, include home, auto, home equity, credit cards, etc. Representative product offerings within the business segment include lines of credit, equipment loans, building loans, and the like. Representative entities that lend capital include banks, savings and loans, finance companies, as well as others.

In general, the majority of conventional lending has involved the process representatively illustrated in FIG. 1. The process typically includes multiple individuals and entities (100a, 100b, 100c, 100d) with various risk profiles needing financing. The process may include multiple lending entities 120 openly competing to attract multiple independent borrowers (100a, 100b, 100c, 100d). Lenders 120 may use portfolio diversification to reduce risk and maximize profits. Lenders 120 have previously employed portfolio diversification to their advantage because they have the power to structure the portfolios. They acquired customers, diversify risk and extracted a risk premium for their efforts. Lenders 120 have also charged interest aimed at covering cost of capital, cost to acquire customers, cost to cover defaults, operating costs, as well as a target rate of return. As part of the cost to acquire customers, some lenders 120 aggregate volume through brokers 110 (e.g., as in the case of mortgage brokers), thereby further increasing costs. This conventional workflow discourages additional non-traditional lending sources, such as pension funds, corporations with excessive cash on-hand, or governments, for example, from more directly entering the lending marketplace in order to earn more than money market rates. Money market rates are those low rates offered by banks and others for merely holding cash. The conventional loan process concludes with borrowers receiving funds (130a, 130b, 130c, 130d) and repaying lenders (140a, 140b, 140c, 140d). Alternatively, borrowers in default (150a, 150b, 150c, 150d) may enter collections 160 if they are unable to continue payments under the program.

Conventional lending processes may be efficient for individuals and entities that have access to financing; however, highly leveraged individuals and entities, and those with less than perfect credit ratings, generally pay substantial interest penalties from this process and may have fewer available financing options. Conventional lending programs generally operate to prevent individual borrowers from directly participating in cost savings typically associated with diversification or the leveraging of terms to negotiate lower fees. Accordingly, the conventional lending art is inefficient for borrowers, since it generally prevents them from obtaining institutional knowledge to leverage volume in negotiations with suppliers. Moreover, the conventional lending art also inhibits lowering borrower costs through risk diversification.

In addition, the current lending process is inefficient because it is highly fragmented. There are many entities such as banks, savings and loans and finance companies. There are also many brokers or intermediaries that initiate and aggregate loans. All of these entities must support their independent operations. These costs, in turn, contribute to excessive lending fees.

In addition, the large number of lenders or intermediaries in the marketplace has forced many lenders to practice predatory lending in order to meet financial growth forecasts. For example, many credit card companies have promotional practices that offer low up front interest rates in order to attract customers. Once they have the customers, they monitor their customer's credit reports to detect any changes in risk profile. If a change is detected, sometimes even minor, they usually raise the interest rate of the customer to as high of a rate as allowable by law. As another example, Lenders routinely charge a varying number of fees aimed at improving profitability and not improving the process. Examples of these types of fees include late payments and over credit line fees.

SUMMARY OF THE INVENTION

In various representative aspects, the present invention provides systems and methods for enabling financial collaboration networks. Exemplary features generally include a data processing system adapted to permit a plurality of group collaborators to perform financial transactions with a plurality of users or network participants.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 1:
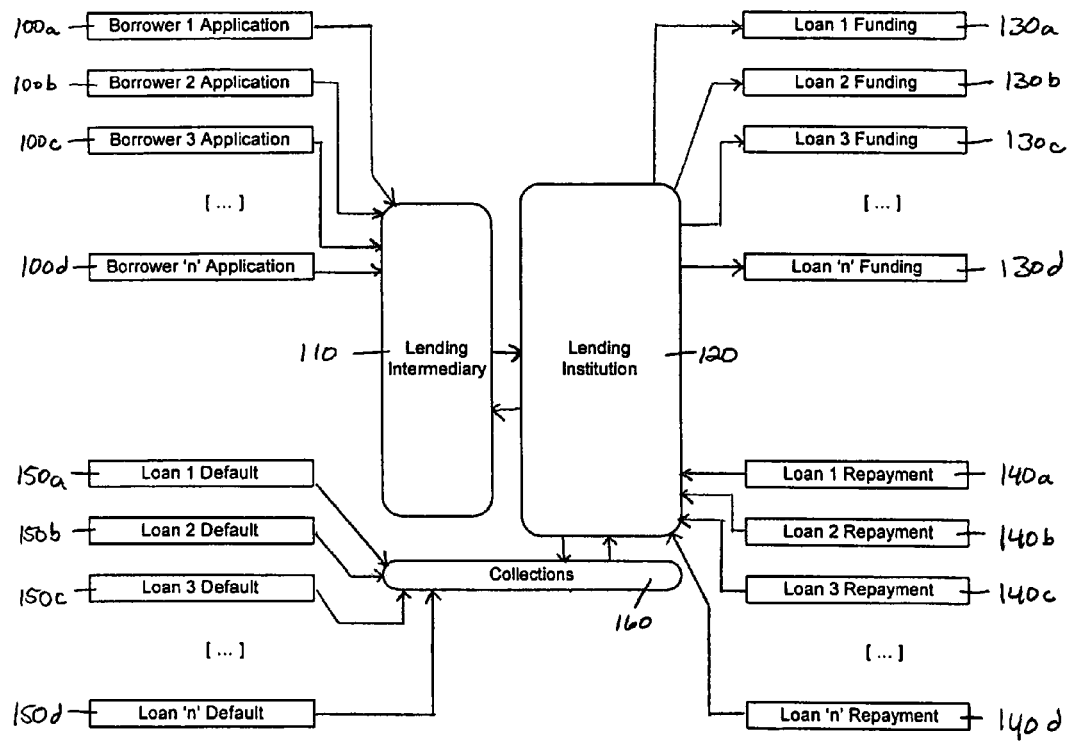
FIG. 1 representatively illustrates a block diagram of a conventional lending system in accordance with the prior art.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system for facilitating online financial transactions. Certain representative implementations may include, for example: allowing borrowers to collaborate to negotiate better terms with lenders; permitting organizations to collect dues from their members; creating an exchange for the lending of capital between participants that are either known or unknown to each other; enabling open or closed lending networks; and/or the like.

In a representative embodiment, a lending network marketplace may be suitably configured to provide borrowing and lending processes that are facilitated by software, the Internet and/or conventional fund transferring technologies. A benefit of various exemplary embodiments of the present invention is directed to increasing the financing options for individuals and entities. For example, the present invention may focus on reducing borrowing costs for individuals and entities. A representative embodiment of the present invention is an online marketplace that allows individuals or entities to gain exposure, leverage and transparency by allowing them to join and/or create private or open lending networks. Furthermore, the invention may also permit individuals and/or entities to participate in other network structures.

In an exemplary embodiment, the present invention permits individuals and/or entities to lend funds to certain networks. Specifically, the present invention may allow borrowers to locate other borrowers so they can formally or informally network together to obtain benefits, which may include portfolio diversification. Additionally, the present invention may allow individuals and entities to tap private networks to borrow funds at no cost, less than market cost or allow individuals or entities access to an open network of individuals or entities to borrow funds from. The present invention may further provide individuals or entities interested in lending funds a mechanism to do so. Moreover, the present invention may allow for the creation of other network structures aimed at improving buying and negotiating power.

In a representative application, the present invention pertains to: increasing lending options for individuals and entities; reducing costs for borrowers by allowing them to benefit from risk diversification; and lowering costs for lenders by reducing their customer acquisition and/or transaction/duplication costs. The present invention may be facilitated by software or the Internet which may allow for the administration of private or public lending networks. Because of the reach of the Internet, participants in these networks may be located in various parts of the world or networks may be directed to specific countries or regions of the world.

A representative embodiment of the present invention comprises an on-line lending network marketplace where individuals and/or entities can join and/or create various types of private and public lending networks. In general, the present invention creates an open and more transparent Money Market. This transparent Money Market may be directed to a specific country, region of the world or the entire world. As used herein, a private network generally refers to a group of individuals or entities that are somehow related or known to each other. A public network may be defined as a group of individuals or entities that are not necessarily related or known to each other. Individuals may also create hybrid networks that contain known and unknown individuals.

Figure 2:
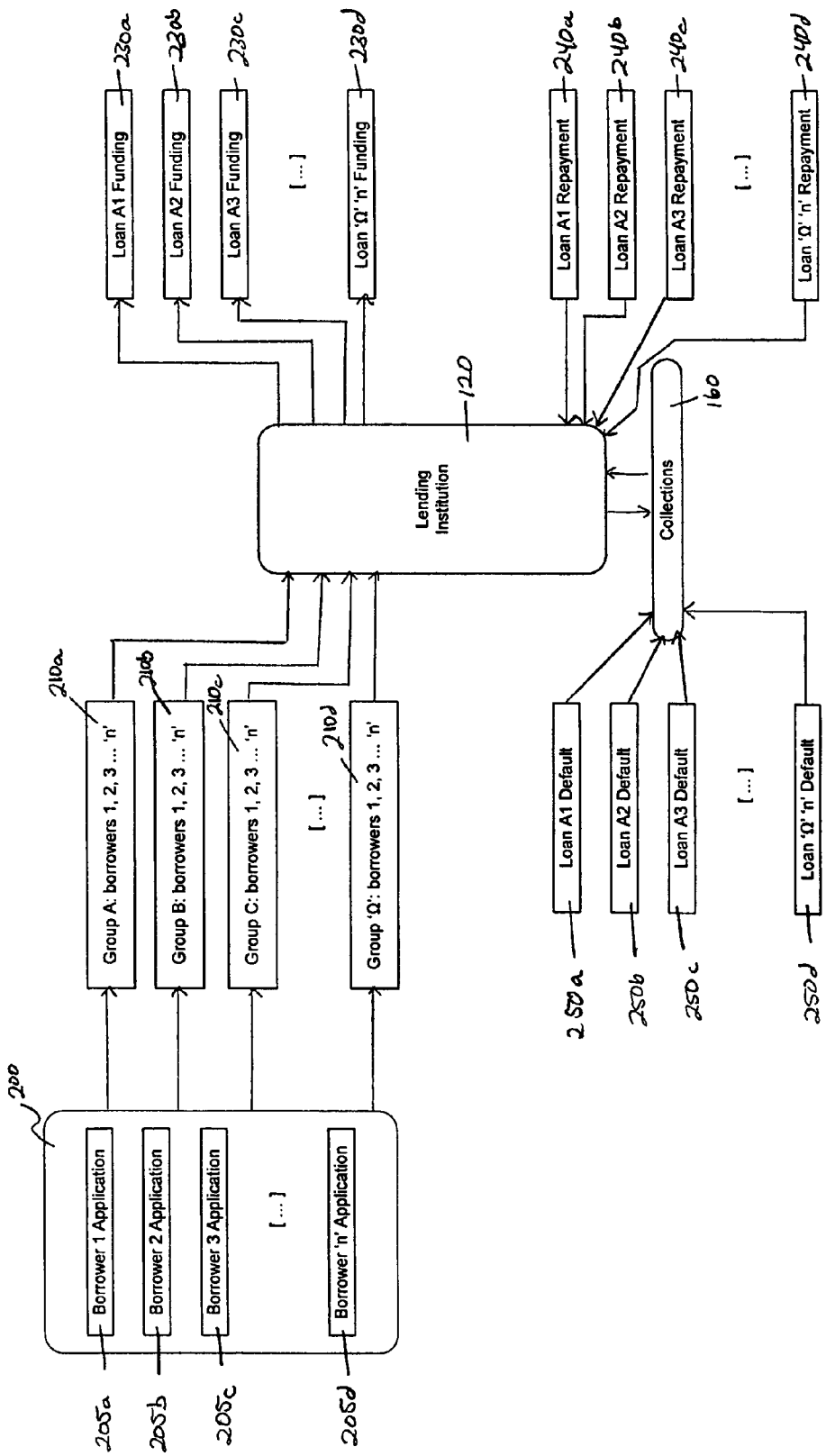
FIG. 2 representatively illustrates a block diagram of a collaborative loan network in accordance with an exemplary embodiment of the present invention.

Creating public and private lending networks may provide borrowers with substantial benefits over conventional lending. For example, borrowers may have a mechanism whereby they can pool demand in order to increase their indirect buying or negotiating power, as representatively illustrated in FIG. 2, for example.

A representative process generally involves an online marketplace lending network system 200 (i.e., financial collaboration network system) accessed by a plurality of participants (i.e., individuals and/or entities) (205a, 205b, 205c, 205d) with various risk profiles needing loan financing. The process may include multiple lending entities 120 receiving offers to finance a plurality of borrower groups (210a, 210b, 210c, 210d). Borrower groups (210a, 210b, 210c, 210d) may be grouped by financial collaboration network system 200 or may be self-assembled by the borrowers (205a, 205b, 205c, 205d) themselves. Borrower groups (210a, 210b, 210c, 210d) may be assembled by risk profile, financing product, or any other parameter. For example, borrower groups (210a, 210b, 210c, 210d) may comprise individual members that share a substantially common purpose for participating in the financial collaboration data network 200 or at least one relational characteristic substantially common to the group. Representative relational characteristics may include sex, race, religion, ethnic background, language, sexual orientation, age, political philosophy, academic attainment, profession, employment, genetic relationship, familial relationship, professional interest, business interest, recreational interest, charitable interest, investment interest, shared life experience, country, region of the world, or friendship.

The loan process proceeds with borrowers receiving funds (230a, 230b, 230c, 230d) and repaying lender(s) (240a, 240b, 240c, 240d). Alternatively, borrowers in default (250a, 250b, 250c, 250d) may enter collections 160 if they are unable to continue payments under the program.

Additionally, borrowers may have a mechanism whereby they can recognize the benefits of portfolio risk diversification to reduce their costs. For example, the online marketplace network may be suitably adapted to qualify buyers, structure requests into portfolios, and lend funds at Pay Day loan rates (i.e., $50 charge for borrowing funds for two weeks; with an APR of approximately 244%). Funds may be paid to borrowers and repaid to the marketplace network electronically. The online marketplace network system may be configured to calculate a return for the portfolio (taking into account defaults and collections), subtract a marketplace fee, and refund remaining funds to the borrowers electronically. The online marketplace system may also create other portfolio lending networks for other loan products. These portfolios may also be structured to have asset backed guarantees. For example, see the following table:

Borrowers may be grouped in any number of ways, such as one large portfolio for a given period of time, or in smaller portfolios of varying sizes. Funds may be lent by the marketplace network system directly or by other lenders invited to bid on each portfolio (e.g., with the lowest rate landing the business and marketplace network fees). Moreover, in various other embodiments, in accordance with further representative aspects of the present invention, borrowers may be able to leverage personal lending networks to borrow even more inexpensively.

Creating public and private lending networks may provide lenders one or more benefits over conventional lending. For instance, it may reduce lender's customer acquisition costs (e.g., reducing the need for brokers by providing pools of borrowers ready to transact). As another example, it may reduce lender's operating costs via payment automation. Many payments may be transacted with EFTs. Moreover it may give lenders access to new borrowers. Non-typical lenders may have an opportunity to fund lending networks.

The invention may embody an online marketplace system 200 that is accessible over a network such as the Internet, and may be accessible through a website, viewed on a monitor and/or the like. The online marketplace system may include software and may be run on servers that connect to the Internet. In other representative embodiments, participants (205a, 205b, 205c, 205d) may access the network by, for example, phoning a call center where requests and information may be ordered through employees and uploaded to the system.

In some embodiments, participants (205a, 205b, 205c, 205d) may access the network at a physical branch or affiliate

TABLE 1

Pay Day Portfolio Lending Network

| Borrowers | Loan Amount | Fund Date | Repayment | Initial Fees | Payments Due | Payments Received |
|---|---|---|---|---|---|---|
| 1 | $500 | $15^{TH}$ of month | $30^{TH}$ of month | $50 | $550 | $0 |
| 2 | $500 | $15^{TH}$ of month | $30^{TH}$ of month | $50 | $550 | $0 |
| 3 | $500 | $15^{TH}$ of month | $30^{TH}$ of month | $50 | $550 | $0 |
| 4 | $500 | $15^{TH}$ of month | $30^{TH}$ of month | $50 | $550 | $0 |
| 5 | $500 | $15^{TH}$ of month | $30^{TH}$ of month | $50 | $550 | $0 |
| 6 | $500 | $15^{TH}$ of month | $30^{TH}$ of month | $50 | $550 | $0 |
| 7 | $500 | $15^{TH}$ of month | $30^{TH}$ of month | $50 | $550 | $0 |
| 8 | $500 | $15^{TH}$ of month | $30^{TH}$ of month | $50 | $550 | $0 |
| 9 | $500 | $15^{TH}$ of month | $30^{TH}$ of month | $50 | $550 | $0 |
| 10 | $500 | $15^{TH}$ of month | $30^{TH}$ of month | $50 | $550 | $0 |
| 11 to 1000 | $495,000 | $15^{TH}$ of month | $30^{TH}$ of month | $49,500 | $544,500 | $544,500 |
| TOTAL | $500,000 | | | $50,000 | $550,000 | $544,500 |

In this exemplary process of a Pay Day portfolio lending network according to an representative embodiment of the present invention: the marketplace has structured a Pay Day loan portfolio for 1,000 people and 1,000 people request and obtained funding; the loan amounts are $500 each; Electronic Fund Transfer ("EFT") funding takes place on the 15th of the current month; repayment takes place on the 30th of the current month; the initial fee to borrowers is set at a current market rate of $50 (approx. 244% APR); total payment due upon repayment is $550 per borrower; payments received were $544,000 for all borrowers at the 30th of the month (i.e., 10 people defaulted); a gain is calculated for the portfolio on the order of $34,500, which is calculated by taking total payments received and subtracting the original principal lent; and a marketplace fee of $10 per person (approx. 50% APR) is collected.

via on-site monitors or through onsite employees. In further embodiments, payments may be automated over the Internet primarily in the form of EFTs or via any other method, whether now known or otherwise hereafter described in the art, for transmitting funds. Participants may also be asked to join and deposit funds to the marketplace so that loans and payments can be transferred from account to account without the need for EFTs. As an example, if the marketplace is a bank where individuals have bank accounts one would be able to move funds from one account to another with little or no cost.

Figure 3:
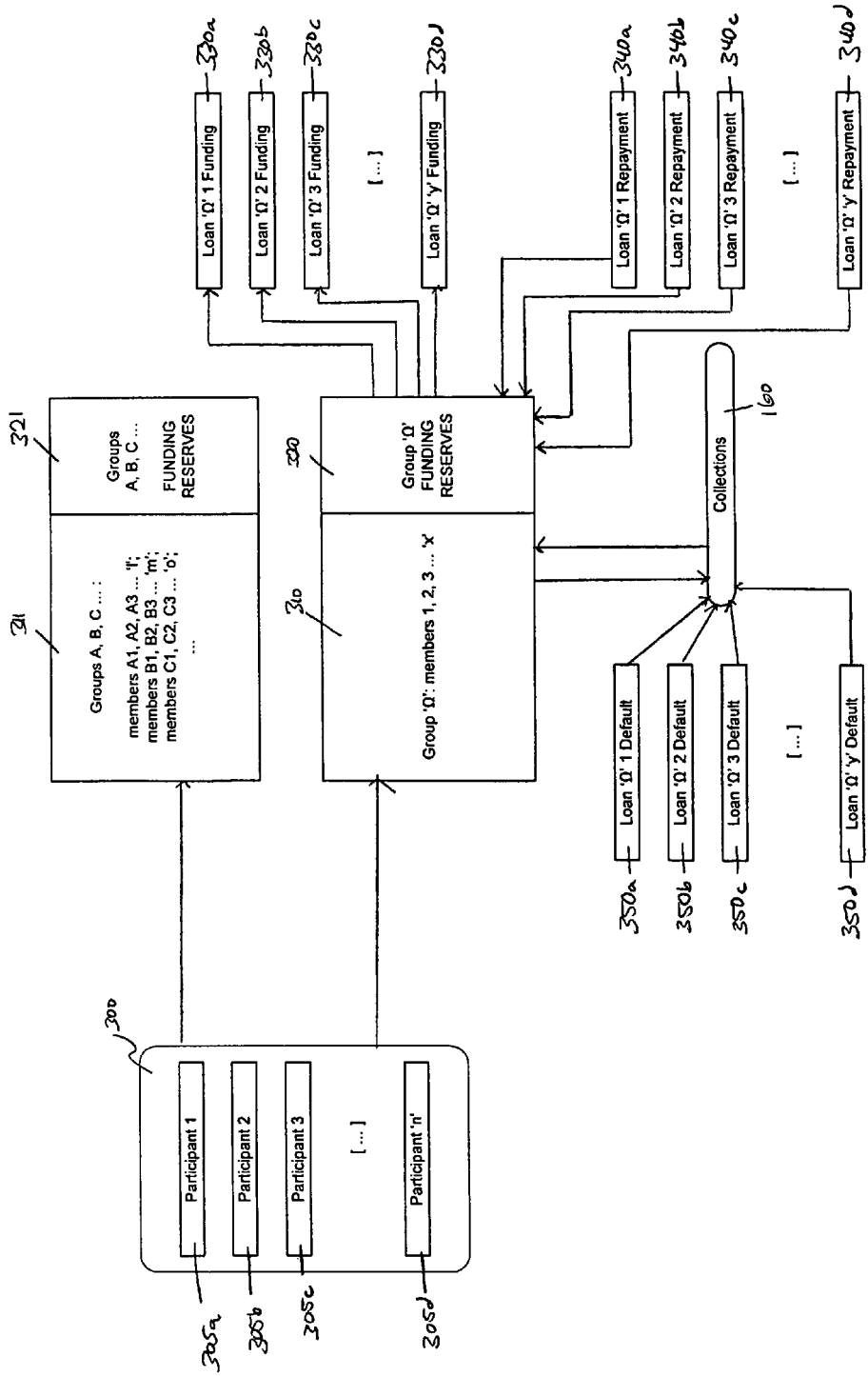
FIG. 3 representatively illustrates a block diagram of a collaborative loan network in accordance with another exemplary embodiment of the present invention.

Financial collaboration networks 300 in accordance with other exemplary aspects of the present invention may allow individuals or entities to lend to each other, as representatively illustrated in FIG. 3. Individuals or entities (305a, 305b, 305c, 305d) may be assembled into groups (310, 311) suitably configured as private lending networks, for example, that pool payments (340a, 340b, 340c, 340d) and distribute payouts (330a, 330b, 330c, 330d) from group funds (320, 321) to certain participants at a lower cost or no cost (less transaction fees) and may have the option of charging interest. In this embodiment, borrowers may leverage a network of known or unknown individuals or entities to lower borrowing costs and expand funding options. Borrowers in default (350a, 350b, 350c, 350d) may enter collections 160 if they are unable to continue payments under the program.

Another aspect of some embodiments of the invention is that individuals may be able to borrow together in portfolios or via syndicate borrowing. Borrowers may join networks that effectively act as a loan portfolio. Individuals may be charged market rates for loans that have similar time horizons. Once the loans are closed, a return may be calculated for the portfolio and profits, in excess of marketplace fees, may be returned to borrowers—thereby effectively lowering their total costs of borrowing. This provides borrowers a mechanism to reverse the benefit of portfolio diversification from lenders to borrowers. This may be attained by providing borrowers a marketplace where they can pool funds and leverage buying power and transparency.

In representative and exemplary embodiments, financial collaboration network systems may be offered by product type. As an example, there may be portfolio lending networks for borrowers seeking short term loans such as Pay Day loans, car loans, automobile title loans, home loans, home equity loans and debt repayment loans, among others.

In some exemplary embodiments, the marketplace may offer additional services. Some of the services may include collections, debt counseling, affiliations with other businesses and retailers and so on. In other exemplary embodiments, the users may be routed through a registration and authentication process to ensure security. They may also be required to provide pertinent banking details to automate payments.

In further representative embodiments, the financial collaboration marketplace may offer a vast array of lending network pools with a plurality of structures and with a plurality of parameters; one or more of which may reduce borrowing costs and improve negotiating leverage. A few of these embodiments may include portfolio lending networks, private lending networks and open lending networks. It will be appreciate, however, that once financial collaboration systems are introduced to participants, and given the variety of customized mechanisms of use available to the participants, it will be difficult to comprehensively describe every way that financial collaboration networks may be used in order to provide a benefit to the participants. That notwithstanding, the following examples are provided as specific enabling disclosures that may be generalized to any system or method for providing financial collaboration networks in accordance with representative aspects of the present invention:

Example 1

Portfolio Lending Financial Collaboration Networks

The marketplace may create portfolio lending networks for loan products that have a high demand and where there is fragmentation in the industry that contributes to excessive fees and transaction costs. Examples of such loan products include Pay Day loans (small short term loans), used car loans, high interest credit cards, and the like. Pay Day loans illustrate how an exemplary embodiment of the disclosed financial collaboration network (i.e., a portfolio lending network), may operate. Currently, banks and check cashing outlets offer short term loans for very large fees. A typical example of such a loan is one that is for $500, costs $50 and is good for 2 weeks. This has an annualized percentage rate of approximately 243%. The marketplace may offer a pool of participants (sizes may vary) the opportunity to borrow the same $500 for the same $50 and the same 2 weeks. Once the participants repay the loans, the marketplace may calculate the gain/loss and may refund any gains less a marketplace fee to the group of borrowers. As an example, assume that the marketplace issued $500 loans to a pool of 1000 people for a fee of $50 to be paid in two weeks along with the principal. That is $500,000 in loans today and $550,000 to be repaid in two weeks. In two weeks, we may expect 990 of the individuals to repay the $500 plus the $50 fee and 10 that perhaps do not repay. Those that do not pay may go to collections. In this example, the portfolio has a gain of $44,500 less fees of $10 (or some other amount) per loan (50% interest annualized on lending the $500,000 for 2 weeks=$10,000). The remaining $34,500 may be returned to the 990 that paid ($35 per person). Therefore, by borrowing as part of a portfolio lending network that is managed by the marketplace, borrowers only pay $15 instead of paying $50 (annualized savings of 170%) as representatively illustrated vide supra. The marketplace may fund these loans directly or may allow others to fund and may require collateral. Portfolio Lending Networks allows individuals or entities the ability to join together, to jointly diversify risk and gain the benefits of portfolio diversification. This structure allows individuals and entities with a propensity to pay a new and lower cost way to borrow.

Example 2

Private Lending Financial Collaboration Networks

In this representative embodiment, the present invention may be suitably configured to permit individuals to organize and facilitate private lending or savings networks. These online networks may allow participants to save money on a weekly, bi-weekly, monthly, or other timeline basis while simultaneously lending money to participants in the network over that same period. The system may allow individuals in a network to pool their regular payments so one or more of the participants is able to get a lump sum distribution over the given time-period as generally illustrated vide infra:

TABLE 2

Private Lending Financial Collaboration Networks

| | | Week 1 | Week 2 | Week 3 | Week 4 | Week 5 | Week 6 | Week 7 | Week 8 | Week 9 | Week 10 | Totals |
|---|---|---|---|---|---|---|---|---|---|---|---|---|
| participant | 1 | $100 | $100 | $100 | $100 | $100 | $100 | $100 | $100 | $100 | $100 | $1,000 |
| | 2 | $100 | $100 | $100 | $100 | $100 | $100 | $100 | $100 | $100 | $100 | $1,000 |
| | 3 | $100 | $100 | $100 | $100 | $100 | $100 | $100 | $100 | $100 | $100 | $1,000 |

TABLE 2-continued

Private Lending Financial Collaboration Networks

|  | Week 1 | Week 2 | Week 3 | Week 4 | Week 5 | Week 6 | Week 7 | Week 8 | Week 9 | Week 10 | Totals |
|---|---|---|---|---|---|---|---|---|---|---|---|
| 4 | $100 | $100 | $100 | $100 | $100 | $100 | $100 | $100 | $100 | $100 | $1,000 |
| 5 | $100 | $100 | $100 | $100 | $100 | $100 | $100 | $100 | $100 | $100 | $1,000 |
| 6 | $100 | $100 | $100 | $100 | $100 | $100 | $100 | $100 | $100 | $100 | $1,000 |
| 7 | $100 | $100 | $100 | $100 | $100 | $100 | $100 | $100 | $100 | $100 | $1,000 |
| 8 | $100 | $100 | $100 | $100 | $100 | $100 | $100 | $100 | $100 | $100 | $1,000 |
| 9 | $100 | $100 | $100 | $100 | $100 | $100 | $100 | $100 | $100 | $100 | $1,000 |
| 10 | $100 | $100 | $100 | $100 | $100 | $100 | $100 | $100 | $100 | $100 | $1,000 |
| Weekly Payouts | $1,000 | $1,000 | $1,000 | $1,000 | $1,000 | $1,000 | $1,000 | $1,000 | $1,000 | $1,000 | $10,000 |
| Transaction Fees | $10 | $10 | $10 | $10 | $10 | $10 | $10 | $10 | $10 | $10 | $100 |
| User Fees | $5 | $5 | $5 | $5 | $5 | $5 | $5 | $5 | $5 | $5 | $50 |
| Net Proceeds | $985 | $985 | $985 | $985 | $985 | $985 | $985 | $985 | $985 | $985 | $9,850 |
| Cost to User/Fees Earned | 1.5% | 1.5% | 1.5% | 1.5% | 1.5% | 1.5% | 1.5% | 1.5% | 1.5% | 1.5% |  |
| Total Fees | $15 | $15 | $15 | $15 | $15 | $15 | $15 | $15 | $15 | $15 | $150 |

As generally illustrated in Table 2, representative parameters to be set by the collaboration group initiator and agreed to by participants may include, inter alia: the value of the Personal Lending Network (e.g., $10,000); the amount of funds needed (e.g., $1,000); the number of participants (e.g., 10); frequency of payments; duration (e.g., 10 weeks); order of Pay Outs (e.g., participant 1 in week 1, participant 2 in week 2, participant 3 in week 3, etc.); whether participants sign promissory notes; whether the collaboration group collects on default amounts; transaction fee(s) (e.g., 1.5%); user fee (e.g., $5); etc.

As a representative example, if the total of all monthly payments in a network totals $3,000, one person in the network may receive a payment (e.g., loan) for $3,000 for that month's distribution. The process could conceivably continue until every participant has made his or her required payments and every participant has received a substantially equal lump sum payment. This process allows individuals to network borrowing to reduce expenses. Furthermore, the network may charge interest. Individuals participating may agree on a distribution preference.

More specifically, representative method steps in accordance with exemplary aspects of the present invention may include the following: an individual or entity in search of funds may enter the marketplace electronically or with the assistance of marketplace employees and create a group; the participant may name the group and invite parties that have not necessarily previously agreed to participate; the participant opening the group may be termed the "initiator"; the initiator adds their names, email addresses and other contact information to the collaboration group database; the initiator fills out certain personal information such as their banking, savings or credit card information and contact details; other participants may also fill out similar information; etc. Gathering such information may be helpful because the network may be adapted to administer savings and loan deposits and/or payments automatically.

The initiator defines the parameters of the group, including but not limited to characteristics such as duration, frequency of payments, amount of payments, pay out frequency, order of payment, collateral, promissory notes, collection rights in the event of default, requirement for credit information or other personal information such as social security, place of employment, start date and any other potential parameters. The collaboration group marketplace may dictate a minimum amount of required information. The initial parameters to choose from may include but are not limited to any of the following in addition to other parameters as one reasonably skilled in the art might expect: selection of the network size; selection of the group name; definition of the amount of capital required by each participant; selection of the duration; selection of the frequency of payments; the selection of the distribution frequency; selection of the order of payments to participants (in some cases, the initiator may be awarded the option of taking the first distribution); the initiator may have the authority to set distribution order; alternatively, conjunctively or sequentially, the initiator may also have the option of randomly sorting all or any remaining priorities for payment in the repayment queue; determination if participants must collateralize their participation or agree to a promissory note; determination if participants may need to provide other personal information including but not limited to social security number, address, alternate contact information and any other information that may be relevant in the future; selection of alternate initiators (it may be necessary to replace the initiator for one of many reasons, including default); acceptance of the marketplace's terms and conditions of participation including applicable fees; confirmation that he/she is aware of the options available in case of default.

Options available in the case of default include, but are not limited to, the following: If the defaulting participant has already received their distribution, the system may assume and calculate a loss. In this case, the system may add the defaulter's payments, subtract the defaulter's distribution amount, and divide by the total number of payments left to be made by the remaining participants to calculate the additional monthly payment for each remaining participant. Alternatively, conjunctively or sequentially, the amount may be subtracted from the lump sum payments of each remaining participant. Effectively, the system may be suitably adapted to calculate alternate means of covering the loss by the remaining network.

The initiator may decide to increase the remaining payments for each participant by the additional payment amount or decrease the lump sum payouts for each remaining participant (e.g., continuation). If a remaining participant has already been given a pay out, that participant may potentially be required to return the difference on the next scheduled payment.

The initiator may decide to terminate the network immediately upon the default of one or more of the member participants. The system may be configured to calculate the total loss of the defaulters, calculate what each participant has paid in, calculate who has received a distribution, and then calculate the impact of the loss to each remaining participant. For participants that have received a distribution, the system may calculate how much must be repaid so that the funds may be re-allocated in a proportional manner to the participants who made regular payments but did not receive a distribution.

Any participant that defaults may be responsible for paying any and all costs associated with collection efforts on the part of the marketplace (e.g., collaboration group). The initiator and/or a vote of the participants may exercise the option of requesting that the group collect on their behalf at any time. If the participant defaulting has not received their pay out. The system may calculate an overage. In this case, the system may be configured to add the defaulter's payments and divide by the total number of payments left to be made by the remaining participants to calculate the additional monthly payment for each remaining participant. Alternatively, conjunctively or sequentially, that amount may be subtracted from the lump sum distributions of each remaining participant. Effectively, the system may be configured to calculate alternate means of covering repayment of the overage by the remaining network.

After the initiator has completed the registration process, the system may be suitably configured to send the participants invitations to join via email or other communication mechanism. Participants may accept and complete the registration process and accept to comply by the collaboration group's terms and conditions, electronically or via some other communication mechanism.

The Initiator may also go to the Market Place and join an established Lending Network. This is a Lending Network that has been substantially been already set-up. The Initiator would still have to send out invites to other participants if it is a private lending network.

Example 3

Open Lending Financial Collaboration Networks

Open lending networks comprise similar functionality as described in Example 2 vide supra except that participants in the open lending networks are less likely to have previous experiences with other participants. They may know the rating of each individual based upon past experience in the marketplace. Participants may start a closed network as described above or open or join an open lending network. The following are some of the differences between the two: Any interested and qualified parties may participate. Participants must generally register with the marketplace to participate. The marketplace encourages and structures the development of networks with common interests. Examples of such networks may include, for example, military officer network, teacher network, church network, and/or the like.

A rating mechanism may be developed and used to assist initiators and participants in understanding the risk of participants. This rating mechanism may involve one or more of the following criteria: current track record of participants, credit worthiness of participant, length of employment, verifiable references, collateral, including auto loans or other assets, etc. In a further embodiment, the marketplace may qualify each individual for a credit limit to be used as guarantee, offer default insurance to participants, and add new ways of structuring networks.

The marketplace may define whether to charge interest or fees and what those costs may be. In one case, participants who obtained distributions later in the program may collect interest from those who obtained earlier distributions. This may encourage more lenders to lend. Lenders may comprise persons, businesses, banks, hedge funds, as well as others.

Example 4

Assistance Financial Collaboration Networks

The disclosed financial collaboration networks may offer a payment service that allows participants to "sponsor" an individual or entity for a period of time. This assistance collaboration network may be used for individuals who are in need of financial assistance, including but not limited to college students and individuals who have lost a job. In this case, a network of individuals may transfer money on a regular basis to one individual. As an example, a church may have a member that lost a job and needs financial assistance for a period of time. In this case, an initiator could invite the church community to join by donating funds for a period of time. The initiator may establish a network of participants to make needed payments for a specified interval and for a given period of time. The marketplace may charge a small administrative fee for providing this service.

Figure 4:
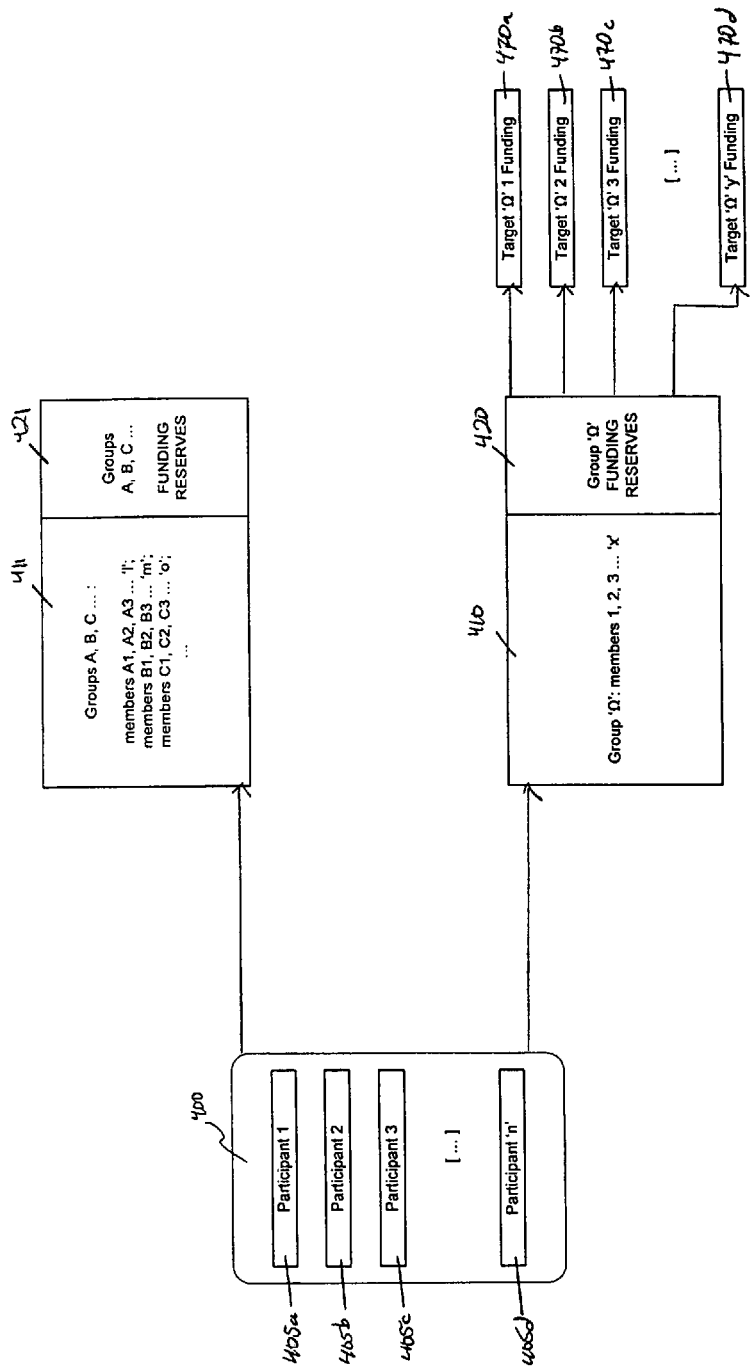
FIG. 4 representatively illustrates a block diagram of a collaborative assistance network in accordance with an exemplary embodiment of the present invention.

Financial collaboration assistance network system 400, in accordance with exemplary aspects of the present invention, may allow individual benefactors or organized charities (e.g., network participants) (405a, 405b, 405c, 405d) to gift funds to target participants (470a, 470b, 470c, 470d), as representatively illustrated, for example, in FIG. 4. Individuals or entities (405a, 405b, 405c, 405d) may be assembled into groups (410, 411) suitably configured as public or private assistance networks that pool funds (420, 421) for subsequent distribution to need-based funding targets (470a, 470b, 470c, 470d). In this embodiment, assistance groups (410, 411) may leverage a network of known or unknown individuals or charitable organizations to lower administrative losses typically associated with less efficient charities or assistance programs.

Example 5

Debt Reduction Financial Collaboration Networks

The financial collaboration network may extend the lending networks product and process to allow participants to lend money to pay off higher interest credit card debts or other debts. Instead of making payouts to individuals, payouts could be to debtors. The marketplace may work with credit companies and others to set-up networks and payment plan structures. Debt Reduction Networks could potentially be structured by a lending company, for example. Individuals who owe funds to the same company could join the same Debt Reduction Network. Jointly, debtors could accelerate payment of each others debts. The network could be integrated or non-integrated with credit companies.

Example 6

Bulk Buying Financial Collaboration Networks

Leveraging the marketplace presence and functionality, the disclosed financial collaboration network system may facilitate a bulk buying process and then offer various ways to finance the goods or services. The service may be offered directly on the marketplace system, at other online marketplaces that sell goods or services, or directly at the website of the manufacturer or distributor. The marketplace, individuals, manufacturers or distributors could be able to set up a bulk buying network for a product or service type. Individuals who sign-up for bulk buying networks would receive a discount price due to the volume being sold. Pricing for products and services may be established in a number of ways. Prices may be set by auctioning, may be directly negotiated between the marketplace and suppliers, and may be set by the marketplace or some other means.

Example 7

Loan Bid Financial Collaboration Networks

In another representative embodiment, the financial collaboration system may be suitably configured to create networks for various loan product needs and then negotiate pricing with lenders either directly, through an auctioning process or some other form to obtain the lowest possible costs for borrowers. The marketplace may be adapted to create Bid Networks for other financial services such as insurance. The negotiation for Bid Networks may be performed before or after borrowers have been secured. The marketplace may then post the loan fees and rates and allow individuals to sign-up to obtain the desired loan with the negotiated fees and rates.

As an example, home loans and refinancings make-up the largest portion of the consumer lending market. Currently, individuals must either go through a mortgage broker or through some other intermediary. There is no easy way for borrowers to tell if they are getting the best deal possible. The current cost of a loan may be 1.5-3% of the loan because of this inefficiency. Lending Networks Marketplace could create a transparent market that allows borrowers to gain transparency and negotiating power to reduce lending fees by requesting loan products through Bid Networks. In one example, the Marketplace could create a Loan Bid Network of potentially 100 slots (the number of slots could be more or less or infinite) of A rated individuals for a 30 year conventional fixed rate loan, assuming 3-5% down and with home values not to exceed $250,000. Lending Networks Marketplace could then openly auction this Loan Bid Network Online to Lenders in order to define and clearly fix fees for a defined period of time based on any number of parameters or until closed. Lending Networks Marketplace could then offer these slots to individuals for free or for a fee. The Marketplace could then repeat this process to meet demand on an ongoing basis for this same product or multiple loan type products and time periods. Lending Networks could potentially be paid a pre-negotiated fee for each of the deals that are closed through the bidding marketplace. With this product, borrowers would have a way to negotiate lower borrowing costs and lenders could lower costs since they would have lower customer acquisition costs.

The marketplace may chose to run multiple auctioning formats simultaneously or sequentially to offer borrowers various quoting options. As an example, in addition to the example above, the marketplace may chose to structure Bid Networks where borrowers sign-up ahead of time for a refundable fee if they accept the winning offer to the Bid Network which may take place in multiple ways with multiple parameters. In this scenario, borrowers may obtain even lower fees at the auctioning of the Bid Network since borrowers are more committed and likely to close on the loan and lenders are therefore more eager to make the lowest bid on the network in order to earn the business.

In an alternative embodiment, financial collaboration network system 700 may embody a financial products/services exchange where lender participants (705*a*, 705*b*, 705*c*, 705*d*) are aggregated into groups (710, 711) with pooled funds (720, 721) for funding loans to borrowers (790*a*, 790*b*, 790*c*, 790*d*). Borrowers (790*a*, 790*b*, 790*c*, 790*d*) may post loan inquiries on exchange system 700, whereby lender collaboration groups (710, 711) and/or lender participants themselves (705*a*, 705*b*, 705*c*, 705*d*) bid to fund loans to borrowers (790*a*, 790*b*, 790*c*, 790*d*).

Example 8

Investment Financial Collaboration Networks

Leveraging the financial collaboration network model, the collaboration group may comprise a Micro Investment Network where individuals arrange automatic transfers to pooled investment funds. The investment funds may be structured to invest in start-up or pre-IPO companies, as well as other investments. This structure would allow small investors the opportunity to engage and invest in an area that is currently only available to high net-worth individuals and entities. The Micro Investment Network may be structured to comply with any and all State and Federal investment regulations.

The Micro Investment Network may function as follows: the investment collaboration group may seek out investment opportunities, research them, qualify them based on certain parameters and detail a road-map of how the collaboration group may build one or various investment portfolios and there expected duration. The Marketplace would then list some or all of these investment opportunities for members to view and read. Members would then be allowed the opportunity to invest or lend funds to the Micro Investment Network in an automated and continuous manner or in a lump sum payment. The invested dollars would remain in place until the portfolio was liquidated. The Marketplace may also institute a mechanism whereby investors may trade or sell ownership positions.

Figure 6:
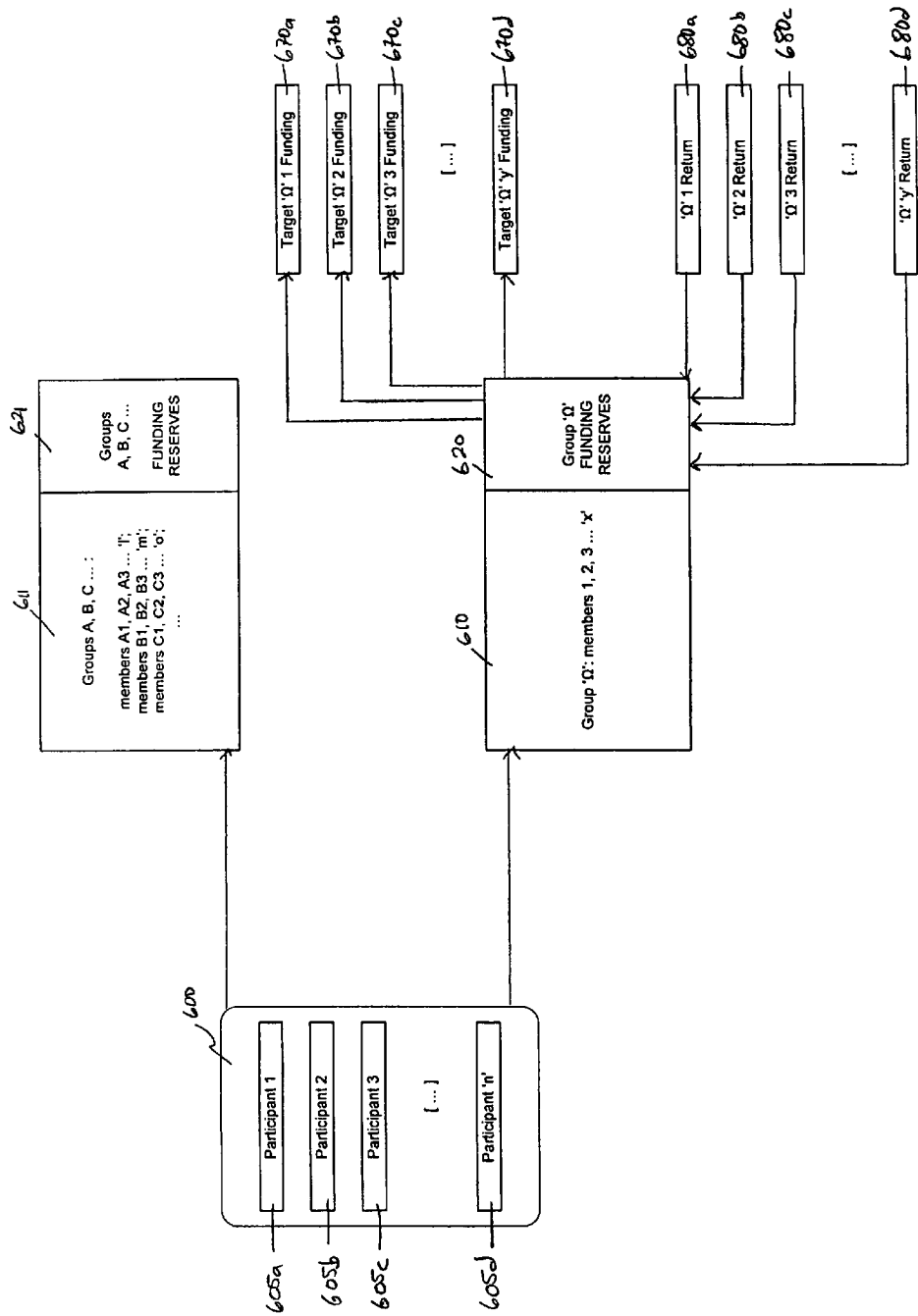
FIG. 6 representatively illustrates a block diagram of a collaborative investment network in accordance with an exemplary embodiment of the present invention.
Figure 7:
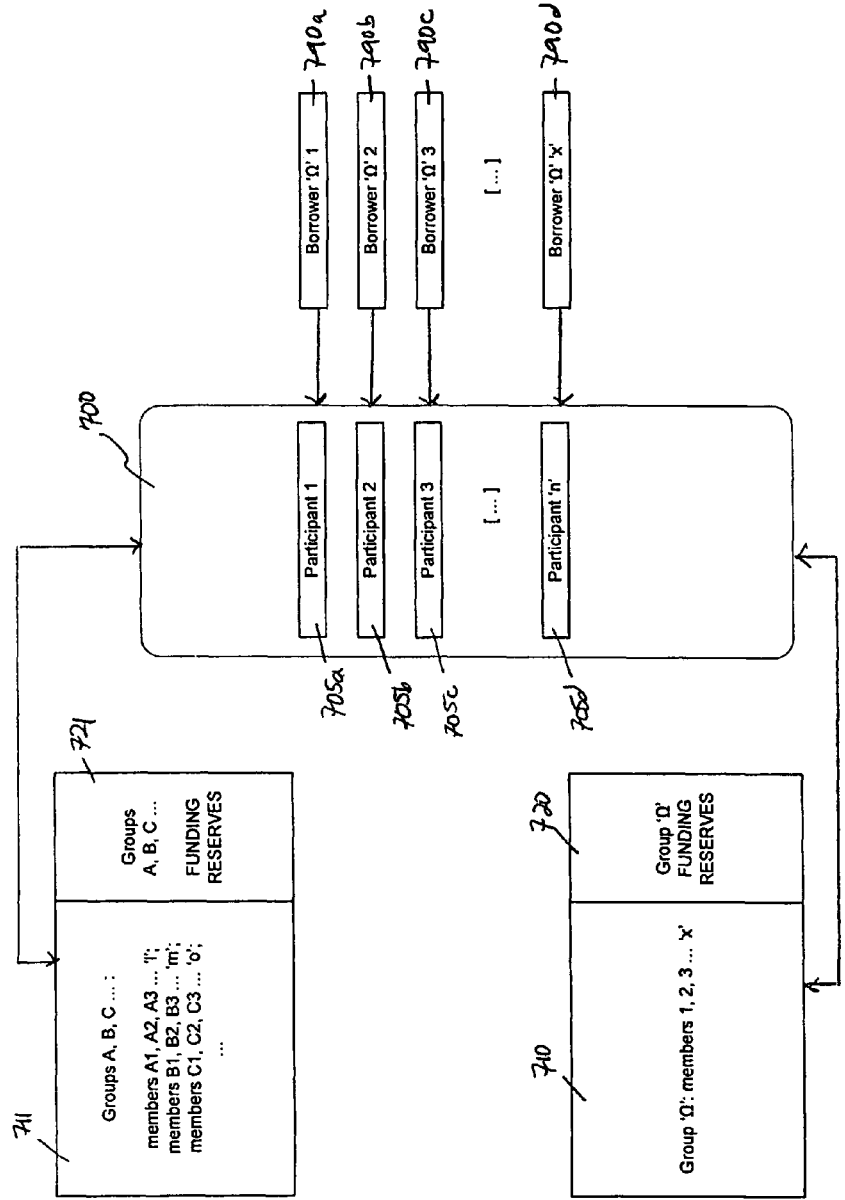
FIG. 7 representatively illustrates a block diagram of a collaborative network and marketplace for providing financial products and services in accordance with an exemplary embodiment of the present invention.

Financial collaboration investment network system 600, in accordance with exemplary aspects of the present invention, may allow investors (e.g., network participants, either persons or business entities) (605*a*, 605*b*, 605*c*, 605*d*) to provide target participants (670*a*, 670*b*, 670*c*, 670*d*) with investment funding, as representatively illustrated, for example, in FIG. 6. Investors (605*a*, 605*b*, 605*c*, 605*d*) may be assembled into groups (610, 611) suitably configured as investment networks that pool funds (620, 621) for subsequent distribution to funding targets (670*a*, 670*b*, 670*c*, 670*d*). Thereafter, returns on investment (680*a*, 680*b*, 680*c*, 680*d*) may be paid to the funding reserves 620 of investment collaboration group 610.

Example 9

Multi-Branch Financial Collaboration Networks

The disclosed financial collaboration network system may be suitably adapted for operation with the aid of physical branches (e.g., "brick and mortar" branch offices) capable of supporting numerous banking or lending customers. Multi-Branches would work like current check cashing outlets but would also be able to process transactions for multiple financial services companies such as banks, mortgage companies, insurance companies and other companies. The multi-branch financial collaboration network may be suitably configured to utilize a software platform that would interface with multiple companies in order to cash checks, receive loan payments, make loans, offer insurance and other potential common services. This Multi-Branch model would reduce duplication costs for financial services companies and offer more competitive services to customers. The Multi-Branch model may also be tied to the Lending Networks financial collaboration network.

Example 10

Home Loan Bid Financial Collaboration Networks

The financial collaboration network system may be configured to provide pre-negotiated terms for Bid Networks (i.e., total closing costs for the loan). The Marketplace Network may use other pricing mechanisms such as auctions. Some pricing components may have to be estimated for each buyer, such as Interest Rates and Impounds. The size of the Bid Networks may be dictated by the lenders (e.g., initial size set to 100). The Marketplace Network may rate the credit of each buyer so that buyers may only join Bid Networks that match their credit rating. The Marketplace Network may provide each borrower a good faith estimate as well as an estimated payment given relevant parameters.

their interest and must agree to pay a refundable deposit—refunded or waived if they close the loan. Based on known parameters, the marketplace may also be configured to provide an overall good faith estimate and an estimated monthly or bi-weekly payment. The marketplace may negotiate its fee directly with the Lenders which may be part of the quoted lender fees. The marketplace may also chose to be a processor of loan paperwork for the lender and may provide other services that will streamline their processes. The marketplace may also chose to reverse auction or Dutch auction bidding networks before or after borrowers have joined to effectively create an open and transparent market for lenders and borrowers. The auctioning process may work in any number of ways. As an example, the marketplace may allow lenders to put in bids for various bid networks. As bid networks are

TABLE 3

Home Loan Bid Financial Collaboration Network

| Borrowers (up to 100) | Approx. Loan Amount (Grouped at $240k or less) | Approx. Fund Date (Grouped at 30 Days or less) | Type of Loan (Grouped at 30 Yr. Fixed Conventional) | Credit Score (Grouped at >700 FICA) | Approx. Down Payment (Grouped at >5%) |
|---|---|---|---|---|---|
| 1 | $130,000 | Next 30 Days | 30 Year Fixed Con. | 701 | $20,000 |
| 2 | $125,000 | Next 30 Days | 31 Year Fixed Con. | 720 | $25,000 |
| 3 | $200,000 | Next 30 Days | 32 Year Fixed Con. | 725 | $40,000 |
| 4 | $99,000 | Next 30 Days | 33 Year Fixed Con. | 725 | $10,000 |
| 5 | $150,000 | Next 30 Days | 34 Year Fixed Con. | 725 | $20,000 |
| 6 | $100,000 | Next 30 Days | 35 Year Fixed Con. | 725 | $10,000 |
| 7 | $100,000 | Next 30 Days | 36 Year Fixed Con. | 725 | $10,000 |
| 8 | $100,000 | Next 30 Days | 37 Year Fixed Con. | 725 | $10,000 |
| 9 | $100,000 | Next 30 Days | 38 Year Fixed Con. | 725 | $10,000 |
| 10 | $100,000 | Next 30 Days | 39 Year Fixed Con. | 725 | $10,000 |
| 11 to 100 | $9,000,000 | Next 30 Days | 40 Year Fixed Con. | 710 | $900,000 |
| TOTAL | $10,204,000 | | | | $200,000 |

Home Loan Bid Financial Collaboration Network

| Borrowers (up to 100) | Quoted Lender Fees to Close | Approx. Interest Rate (Current Market Rate) | Approx. Interest Buy Down Option Cost (to 4.75%) | Approx. Interest Buy Down Option Cost (to 4.5%) | Buyer Quote Fee (fully refundable if deal closes) |
|---|---|---|---|---|---|
| 1 | $2,000 | 5% | No | No | $10 |
| 2 | $2,000 | 5% | No | No | $10 |
| 3 | $2,000 | 5% | No | No | $10 |
| 4 | $2,000 | 5% | No | No | $10 |
| 5 | $2,000 | 5% | No | No | $10 |
| 6 | $2,000 | 5% | No | No | $10 |
| 7 | $2,000 | 5% | No | No | $10 |
| 8 | $2,000 | 5% | No | No | $10 |
| 9 | $2,000 | 5% | No | No | $10 |
| 10 | $2,000 | 5% | No | No | $10 |
| 11 to 100 | $180,000 | 5% | No | No | $900 |
| TOTAL | $200,000 | | | | $1,000 |

In the example illustrated in Table 3, the marketplace has structured a bidding network for up to 100 individuals, looking for a 30 Year Fixed Conventional Loan that needs funding within 30 days, for borrowers who plan to put down at least 5% on their homes with loan values under $240,000 and Credit FICO scores over 700. The marketplace may pre-negotiate fixed closing costs for every participant in the portfolio. Buyers may have the additional option of buying down closed with the necessary number of borrowers, the bid networks may be awarded to the lender who has posted the best offer. Under this scenario, if lender 'A' had the best offer and no other lenders gave better offers, then lender 'A' would continuously be awarded the business. In another example, the marketplace may decide to bid each and every bid network independently. The marketplace may also chose to make this process fully or at least partially transparent.

Example 11

Virtual Treasurer Financial Collaboration Networks

Figure 5:
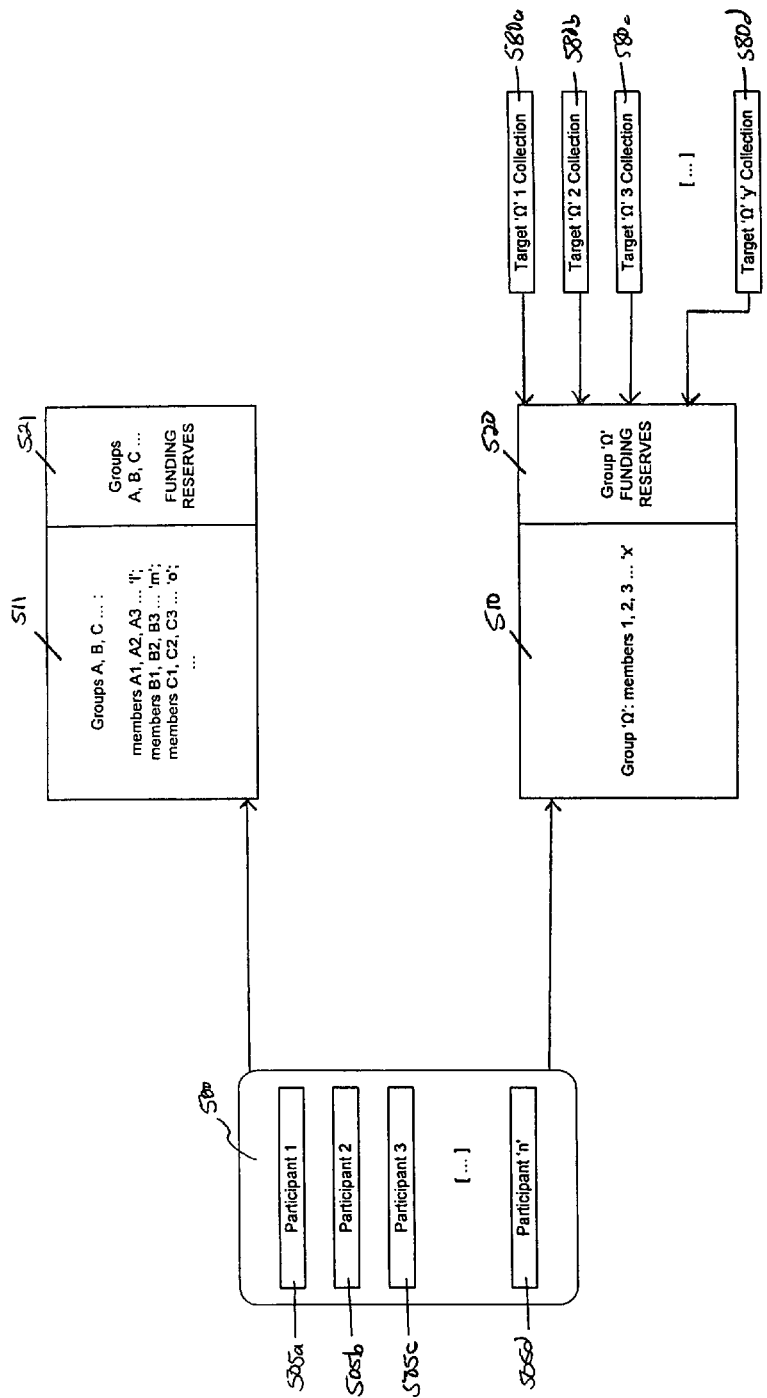
FIG. 5 representatively illustrates a block diagram of a collaborative virtual treasurer network in accordance with an exemplary embodiment of the present invention.

Virtual Treasurer Network system 500, in accordance with exemplary aspects of the present invention, may allow organizations (510, 511) comprised of organization members (e.g., network participants) (505a, 505b, 505c, 505d) to collect funds from their membership (e.g., member participants) (580a, 580b, 580c, 580d), as representatively illustrated, for example, in FIG. 5. Individuals (e.g., treasurers and/or other officers of an organization) (505a, 505b, 505c, 505d) may be assembled into groups (510, 511) suitably configured as virtual treasurers that pool funds (520, 521) derived from funds collected from member participants (580a, 580b, 580c, 580d). The organization thereby saves costs otherwise associated with less efficient methods of collecting membership fees and dues.

The present invention may be described herein in terms of functional block components, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, matchable data structures, and the like, which may carry out a variety of functions under the control of one or more microprocessors or other control devices.

Similarly, the software elements of the present invention may be implemented with any programming or scripting language such as, for example, C, C++, Java, COBOL, assembler, PERL, eXtensible Markup Language (XML), etc., or any programming or scripting language now known or hereafter derived in the art, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction to cryptography, please review the text written by Bruce Schneider entitled "Applied Cryptography: Protocols, Algorithms, And Source Code In C," published by John Wiley & Sons (second edition, 1996).

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

It will be appreciated, that many applications of the present invention could be formulated. One skilled in the art will appreciate that the network may include any system for exchanging data, such as, for example, the Internet, an intranet, an extranet, WAN, LAN, PAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows XP, Windows Whistler, Windows ME, Windows NT, Windows2000, Windows 98, Windows 95, MacOS, OS/2, BeOS, Linux, UNIX, or any operating system now known or hereafter derived by those skilled in the art. Moreover, the invention may be readily implemented with TCP/IP communications protocols, IPX, Appletalk, IP-6, NetBIOS, OSI or any number of existing or future protocols. Moreover, the system contemplates the use, sale and/or distribution of any goods, services or information having similar functionality described herein.

Computing units may be connected with each other via a data communication network. The network may be a public network and assumed to be insecure and open to eavesdroppers. In one exemplary implementation, the network may be embodied as the Internet. In this context, the computers may or may not be connected to the Internet at all times. Specific information related to data traffic protocols, standards, and application software utilized in connection with the Internet may be obtained, for example, from DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). A variety of conventional communications media and protocols may be used for data links, such as, for example, a connection to an Internet Service Provider (ISP) over the local loop, as is typically used in connection with standard modem communication, cable modem, Dish networks, ISDN, Digital Subscriber Line (DSL), or various wireless communication methods. Various systems and sub-systems might also reside within a local area network (LAN) which interfaces to a network via a leased line (T1, T3, etc.). Such communication methods are well known in the art, and are covered in a variety of standard texts. See, e.g., GILBERT HELD, UNDERSTANDING DATA COMMUNICATIONS (1996).

The present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Data communication is accomplished through any suitable communication means, such as, for example, a telephone network, intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A portfolio based financial network, comprising: a plurality of network participants, the plurality of network participants comprising a first network participant comprising a first network participant requesting a loan on a first date and a second network participant funding at least one portion of the requested loan on the first date, wherein the requested loan is of a predetermined value between 100 USD and 3000 USD, wherein a portion of the requested loan is withheld as an advance fee, and wherein the requested loan is repaid on at least a second date with a loan fee; a data processing system, including a computer, the data processing system for managing a corresponding account for each of the plurality of network participants, wherein the data processing system performs financial transactions including a payment deposit related to investment in a portfolio, a loan repayment deposit, a payment distribution associated with the accounts of the plurality of network participants, loan requests of the network participants, and collection of loan fees from the network participants; wherein the data processing system combines loan fees from the network participants into a portfolio fee; wherein the data processing system collects network participant's personal and credit information; wherein the data processing system combines deposits from the network participants in a loan fund; wherein the requested loan to network participants are issued by the data processing system from the loan fund based on a funding criteria; wherein the data processing system determines whether one or more network participants of the plurality of network participants has repaid the requested loan on at least the second date; wherein the data processing system redistributes at least a portion of the portfolio fee among the network participants who repaid their respective loans by at least the second date; and wherein the data processing system calculates a gain or loss on the portfolio for the lenders.

2. The portfolio-based financial network of claim 1, wherein the network participants who did not repay their loans on at least the second date are sent to collections.

3. The portfolio based financial network of claim 1, further comprising:

a process run by Internet accessible software that allows network participants to invest in the portfolio that issues payday or cash advance loans, wherein network participants request payday or cash advance loans from an entity administering the portfolio, wherein the portfolio is designed to refund to borrowers a portion of the borrower's fees based an the repayment of all borrowers and or performance of the portfolio after covering the fees paid to the lenders and the entity administering the portfolio, and wherein the portfolio is hosted in a social network.

4. The portfolio-based financial network of claim 1, wherein the advanced fee may be charged at the time the loan is provided.

5. The portfolio-based financial network of claim 1, wherein the advanced fee is charged at the time the loan is repaid with or without interest.

6. The portfolio-based financial network of claim 1, wherein the loan fee is a difference between the amount of the loan provided to the network participant and the amount of the loan that is repaid by the network participant.

7. The portfolio-based financial network of claim 1, wherein the loan fee is a discount on the loan at the time of funding or repayment or the loan plus a fee amount.

8. The portfolio-based financial network of claim 1, wherein the data processing system, based on lender instructions reinvests the gain in the portfolio.

9. The portfolio-based financial network of claim 1, wherein the data processing system based on lender instructions, invests the gain in a money market account.

10. The portfolio-based financial network of claim 1, wherein the data processing system, based on lender instructions, returns the gain to the lender.

11. The portfolio-based financial network of claim 1, wherein the funding criteria include at least one of following: rating, track record, credit worthiness, length of employment, verifiable references, collateral, asset guarantees and propensity to pay.

12. The portfolio-based financial network of claim 3, wherein the portfolio is hosted on an online financial institution.

13. The portfolio-based financial network of claim 3, wherein the portfolio is hosted at a financial entity.

* * * * *